(12) United States Patent (10) Patent No.: US 9,170,429 B2
Shibata (45) Date of Patent: Oct. 27, 2015

(54) OPTICAL APPARATUS AND IMAGE CAPTURING APPARATUS, AND METHOD OF CONTROLLING THE SAME AND STORAGE MEDIUM

(71) Applicant: CANON KABUSHIKI KAISHA, Tokyo (JP)

(72) Inventor: Masahiro Shibata, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 22 days.

(21) Appl. No.: 14/138,278

(22) Filed: Dec. 23, 2013

(65) Prior Publication Data

US 2014/0186017 A1 Jul. 3, 2014

(30) Foreign Application Priority Data

Dec. 27, 2012 (JP) ................. 2012-286170

(51) Int. Cl.
*G03B 17/00* (2006.01)
*H04N 5/228* (2006.01)
*G02B 27/64* (2006.01)
*G03B 5/00* (2006.01)
*H04N 5/232* (2006.01)

(52) U.S. Cl.
CPC ............. *G02B 27/646* (2013.01); *G03B 5/00* (2013.01); *H04N 5/23248* (2013.01)

(58) Field of Classification Search
USPC ................ 396/55; 348/208.1, 208.4, 208.6
See application file for complete search history.

(56) References Cited

U.S. PATENT DOCUMENTS

2008/0069552 A1* 3/2008 Washisu ................ 396/55
2013/0093905 A1* 4/2013 Saitsu ................ 348/208.4

FOREIGN PATENT DOCUMENTS

JP 06-308564 A 11/1994

* cited by examiner

*Primary Examiner* — Minh Phan
(74) *Attorney, Agent, or Firm* — Carter, DeLuca, Farrell & Schmidt, LLP

(57) ABSTRACT

An optical apparatus includes an imaging optical system, an image capturing unit, a focal length detection unit, an object distance detection unit, a walking shooting determination unit, a sensitivity generation unit configured to generate sensitivity of the correction optical system, a correction amount calculation unit configured to calculate a correction amount of the correction optical system based on the shake amount and the sensitivity, and a control unit configured to drive the correction optical system based on the correction amount. The sensitivity generation unit generates the sensitivity by limiting the object distance or the focal length, or a range of the sensitivity when it is determined that the user of an image capturing apparatus is walking.

22 Claims, 7 Drawing Sheets

OPTICAL APPARATUS AND IMAGE CAPTURING APPARATUS, AND METHOD OF CONTROLLING THE SAME AND STORAGE MEDIUM

BACKGROUND OF THE INVENTION

1. Field of the Invention

The present invention relates to an optical apparatus and an image capturing apparatus having a function of correcting a blur of a captured image due to camera shake or the like.

2. Description of the Related Art

Optical image stabilization, which changes the position of an optical axis in accordance with camera shake by moving a correction lens, is known as a method of correcting an image blur due to camera shake or the like.

In optical image stabilization, the ratio of the displacement amount of an image to that of the correction lens is referred to as decenter sensitivity, and represented by a function of the focal length and the imaging magnification. That is, the displacement amount dL of the correction lens can be represented by sensitivity k, which is represented by the function of the focal length f and the imaging magnification β, and a shake angle θ as:

$$dL = k(f, \beta) \times \theta \quad (1)$$

where the focal length f and the imaging magnification β are values determined by the positions of a zoom lens and a focus lens.

In other words, the displacement amount of the correction lens varies depending on the positions of the zoom lens and the focus lens even when correcting an image blur due to the shake angle of the same camera. Hence, in order to implement satisfactory image stabilization, it is necessary to drive and control the correction lens in accordance with the sensitivity determined by the focal length and the object distance.

Japanese Patent Laid-Open No. 6-308564 proposes a method presented below as a correction method of a correction lens in accordance with the sensitivity. That is, image stabilization is performed by dividing the positions of a zoom lens and a focus lens into a finite number of regions, storing, as a reference table, the sensitivity corresponding to each region in a memory, and using the value of that sensitivity.

In recent years, along with development of a technique of correcting shake of an image capturing apparatus, an image stabilization function of correcting not only a blur of a captured image caused by camera shake when a photographer is in a still state but also a large image blur which is generated in shooting while the photographer is walking has become widespread.

In a technique disclosed in Japanese Patent Laid-Open No. 6-308564 mentioned above, image stabilization is performed by calculating an object distance from the focus lens position to define the sensitivity of the correction lens, and driving the correction lens based on equation (1). However, on the wide side of a lens system of an inner focus type which is becoming widespread, a change in the object distance with respect to the focus lens position is large and the calculation precision of the object distance is low. In addition, during walking shooting, a focus variation for adjusting the focus occurs frequently because a change in an object is greater than in still shooting. Consequently, the following problem arises in the above conventional method.

That is, when walking shooting on a wide side viewing angle, there is a phenomenon in which the object distance undergoes a greater and more frequent change than in still shooting, and sensitivity also undergoes a frequent change accordingly. This is because besides a variation in the focus lens is frequent, the precision of the object distance is low. The phenomenon will be described in detail with reference to examples of an optical characteristic shown in FIGS. 7 and 8.

FIG. 7 is a graph showing the focus lens position to attain focusing at an arbitrary object distance when the focal length, that is, the zoom lens position is changed in a lens system of the inner focus type. The abscissa represents the zoom lens position, and the ordinate represents the focus lens position. Of the curves shown in FIG. 7, the one at the bottom corresponds to a position to attain focusing at an infinite object distance, and they correspond to a position for focusing at an object distance nearer to an image sensing plane as they go to the top. As is apparent from FIG. 7, focus lens positions, which attain focusing at an infinity object distance from approximately 80 cm to ∞ are more dense on the wide side than on the tele side. This means that the depth of field is large on the wide side, and indicates that an out-of-focus state hardly occurs even when the focus lens is subject to shaking to some extent. However, this also means that the object distance detected from the focus lens position easily changes by moving the focus lens just a little, and its precision is low.

FIG. 8 is a graph showing a state in which sensitivity to the object distance changes with respect to a change in the focal length. The abscissa represents the zoom lens position, and the ordinate represents the sensitivity. The change in the sensitivity varies depending on optical conditions, such as a lens configuration. For example, an example shown in FIG. 8 indicates that the sensitivity differs depending on the object distance on the wide side. Under the condition of such optical characteristic, when walking shooting on the wide side viewing angle, a wobbling operation of the focus lens frequently occurs due to a change in the object in a frame. Moreover, since the precision of the object distance is low because of the characteristic in FIG. 7, object distance information detected based on the focus lens position also changes frequently, and along with that, the sensitivity also changes frequently because of the characteristic in FIG. 8.

In practice, the object distance does not change suddenly and frequently, and hence sensitivity for correcting an image blur should be almost fixed. However, because of the optical characteristics above, the change in sensitivity also occurs as the object distance changes. Therefore, a moving amount (a correction amount) of the correction lens calculated based on equation (1) varies even when the shake angle is constant, and as a consequence the correction amount of an image plane on an image sensor also changes and a satisfactory image stabilization effect cannot be obtained.

SUMMARY OF THE INVENTION

The present invention has been made in consideration of the above-described problem, and enables stable image stabilization even when walking shooting.

According to the first aspect of the present invention, there is provided an optical apparatus comprising: an imaging optical system including a correction optical system, which corrects an image blur, a zoom lens for changing a focal length, and a focus lens, which performs focus adjustment; an image capturing unit configured to capture an object image formed by the imaging optical system; a focal length detection unit configured to detect the focal length of the imaging optical system; an object distance detection unit configured to detect an object distance; a shake detection unit configured to detect shake; a walking shooting determination unit configured to determine whether or not a user of an apparatus is walking based on the shake detected by the shake detection unit; a sensitivity generation unit configured to generate sensitivity, which is the ratio of a moving amount of the object image on an image sensing plane to a moving amount of the correction optical system, based on a determination result by the walking shooting determination unit, the focal length, and the object distance; a correction amount calculation unit configured to calculate a correction amount based on the shake amount and the sensitivity; and a control unit configured to drive the correction optical system to correct the image blur based on the correction amount, wherein the sensitivity generation unit generates the sensitivity by limiting at least one of the object distance or the focal length, or a range of the sensitivity when the walking shooting determination unit determines that the user of the apparatus is walking.

According to the second aspect of the present invention, there is provided a method of controlling an optical apparatus including a correction optical system, which corrects an image blur, a zoom lens for changing a focal length, an imaging optical system, which has a focus lens performing a focus adjustment, and an image capturing unit, which captures an object image formed by the imaging optical system, the method comprising: a focal length detection step of detecting the focal length of the imaging optical system; an object distance detection step of detecting an object distance; a shake detection step of detecting shake; a walking shooting determination step of determining whether or not a user of an apparatus is walking based on the shake of the apparatus; a sensitivity generation step of generating sensitivity, which is the ratio of a moving amount of the object image on an image sensing plane to a moving amount of the correction optical system, based on a determination result by the walking shooting determination step, the focal length, and the object distance; a correction amount calculation step of calculating a correction amount based on the shake amount and the sensitivity; and a control step of driving the correction optical system to correct the image blur based on the correction amount, wherein in the sensitivity generation step, the sensitivity is generated by limiting at least one of the object distance or the focal length, or a range of the sensitivity when it is determined, in the walking shooting determination step, that the user of the apparatus is walking.

Further features of the present invention will become apparent from the following description of exemplary embodiments with reference to the attached drawings.

DESCRIPTION OF THE EMBODIMENTS

The embodiments of the present invention will now be described in detail with reference to the accompanying drawings.

First Embodiment

Figure 1:
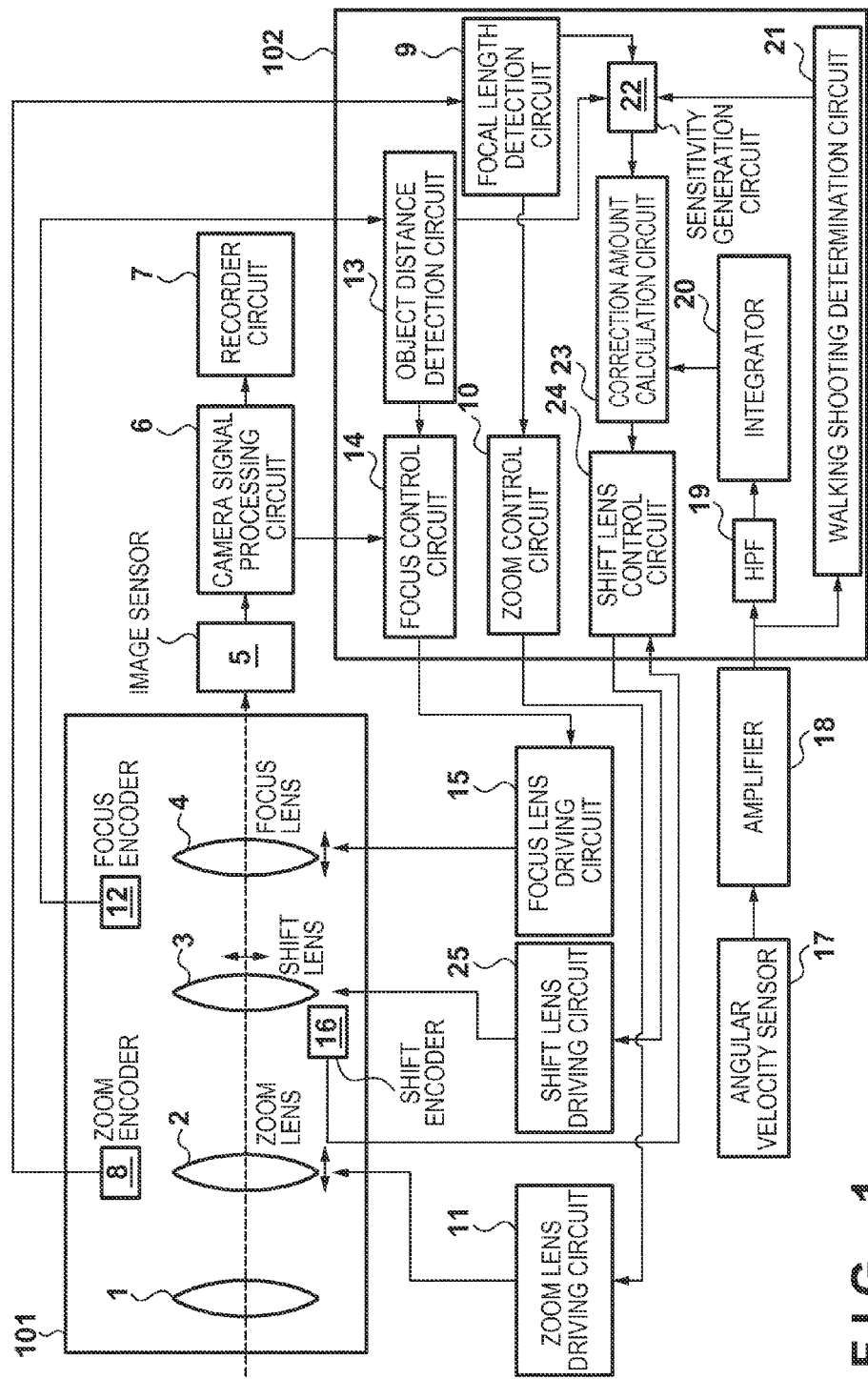
FIG. 1 is a block diagram of showing the configuration of an image capturing apparatus according to an embodiment of the present invention.

FIG. 1 is a block diagram showing the configuration of a digital video camera as an image capturing apparatus including a zoom lens unit as an optical apparatus. Note that the digital video camera as the image capturing apparatus is taken as an example in the first embodiment. However, the present invention is applicable to an optical apparatus such as a lens for a single-lens reflex camera or an image capturing apparatus such as a compact digital camera.

In FIG. 1, a lens unit 101 (an image capturing optical system) includes a zoom lens group (a zoom lens unit) and an image stabilization lens group (a correction optical system: an image stabilization means) inside. The lens unit 101 includes a first fixed lens group 1, which is fixed and a zoom lens group 2 (a zoom lens), which changes magnification by changing the focal length. The lens unit 101 also includes an image stabilization lens group 3 (a shift lens: an image stabilization member), which corrects an image blur by moving in a direction perpendicular to the optical axis. Further, the lens unit 101 includes a focus lens group 4 (a focus lens), which has a focus adjustment function and a so-called compensation function, which compensates for movement of a focal plane due to magnification change. An image sensor 5 photoelectrically converts an optical object image formed via the first fixed lens group 1, the zoom lens group 2, the image stabilization lens group 3, and the focus lens group 4 into a video signal, and outputs it. The image sensor 5 is, for example, a CCD or a CMOS sensor. Note that in the case of an image capturing apparatus such as a compact digital camera, which integrates a lens optical system and an image sensor, an image blur can be corrected by moving, instead of the image stabilization lens group 3, the image sensor 5 in a direction perpendicular to the optical axis.

A camera signal processing circuit 6 includes an analog signal processing circuit (not shown) and a digital signal processing circuit (not shown). The analog signal processing circuit in the camera signal processing circuit 6 performs predetermined processing for a signal obtained by the image sensor 5 to generate an analog video signal. Furthermore, the camera signal processing circuit 6 includes, for example, a CDS (co-related double sampling) circuit and an AGC (Automatic Gain Control) circuit. The digital signal processing circuit in the camera signal processing circuit 6 converts the analog video signal into a digital signal by an A/D converter, and generates a digital video signal obtained by performing predetermined signal processing such as gamma correction and white balance correction for the obtained signal. Moreover, the digital signal processing circuit in the camera signal processing circuit 6 also generates an evaluation signal or the like for AF (auto focus) control or AE (auto exposure) control. A recorder circuit 7 includes a recording apparatus, which records the video signal in a recording medium (such as a memory card, a hard disk, a DVD, and a magnetic tape), a display device, which outputs and displays the video signal to the display device (a liquid crystal panel or a view finder), and a control circuit for them. A microcomputer 102 is a control circuit, which controls the entire image capturing apparatus according to the first embodiment.

A zoom encoder 8 detects the position of the zoom lens 2. A focal length detection circuit 9 detects focal length information based on the output value of the zoom encoder 8. Note that when a driving motor of the zoom lens 2 is a pulse motor such as a stepping motor, the position of the zoom lens may be detected not by including the zoom encoder 8 but by counting driving pulses. A zoom control circuit 10 outputs a control signal to be a driving instruction of the zoom lens based on operation information of a zoom operation unit (not shown) and the focal length information from the focal length detection circuit 9.

A zoom lens driving circuit 11 receives the control signal output by PWM or the like from the zoom control circuit 10, and drives the zoom lens via a motor.

A focus encoder 12 detects the position of the focus lens 4. An object distance detection circuit 13 detects object distance information based on an output value of the focus encoder 12. Note that when a driving motor of the focus lens is a pulse motor such as a stepping motor, the position of the focus lens may be detected not by including the focus encoder 12 but by counting driving pulses. A focus control circuit 14 outputs a control signal to be a driving instruction of the focus lens based on operation information of a focus operation unit (not shown), an AF evaluation signal from the camera signal processing circuit 6 or ranging information from a range sensor (not shown) or the like, and the object distance information from the object distance detection circuit 13. A focus lens driving circuit 15 receives the control signal output by PWM or the like from the focus control circuit 14, and drives the focus lens via the motor.

A shake detection means 17 detects camera shake. The shake detection means 17 is, for example, an angular velocity sensor such as a vibration gyro. An amplifier 18 is an amplifier, and amplifies and outputs an angular velocity signal output by an angular velocity sensor 17. A high-pass filter (HPF) 19 has a function which is capable of changing its frequency characteristic. The HPF 19 cuts off a low-frequency component contained in the angular velocity signal amplified by the amplifier 18, and outputs the obtained signal. An integrator 20 obtains an angular displacement amount by integrating the angular velocity signal output from the HPF 19.

A walking shooting determination circuit 21 determines whether or not walking shooting is progress (whether or not the user is walking), and outputs the result to a sensitivity generation circuit 22. Note that a determination method of walking shooting will be described in detail later. The sensitivity generation circuit 22 generates sensitivity for calculating a moving amount (a correction amount) of the shift lens 3 necessary for image stabilization based on the focal length information and the object distance information. Note that the sensitivity is the ratio of a moving amount of the object image on an image sensing plane to that of the image stabilization lens 3. An operation of the sensitivity generation circuit will be described later.

A correction amount calculation circuit 23 calculates a correction target value of the shift lens based on the angular displacement amount output from the integrator 20 and the sensitivity generated in the sensitivity generation circuit 22. The correction amount calculation circuit 23 calculates the correction target value of this shift lens so as to match image stabilization in the image plane on the image sensor 5 in accordance with the focal length and the object distance. A shift encoder 16 is a Hall sensor or the like which detects the position of the shift lens 3. An output value of the shift encoder 16 is input to a shift lens control circuit 24. The shift lens control circuit 24 calculates a control amount of the shift lens 3 from the difference between the correction target value from the correction amount calculation circuit 23 and the current position of the shift lens 3 obtained by the shift encoder 16, and outputs a control signal. A shift lens driving circuit 25 receives the control signal output by PWM or the like from the shift lens control circuit 24, and drives the shift lens 3 via the motor.

Note that an operation from detection of shake by the angular velocity sensor 17 to image stabilization by the shift lens driving circuit 25 is performed as follows. Two angular velocity sensors 17, for example, are arranged in two axial directions of a rotation axis (Yaw) about the horizontal direction and a rotation axis (Pitch) about the vertical direction so as to form detection axes orthogonal to each other on a plane perpendicular to the optical axis. The correction amount calculation circuit 23 calculates respective correction amounts for the Pitch axis and the Yaw axis based on the detected angular velocity signal. The shift lens driving circuit 25 controls the shift lens 3 in the two axial directions of the horizontal direction and the vertical direction.

Figure 2:
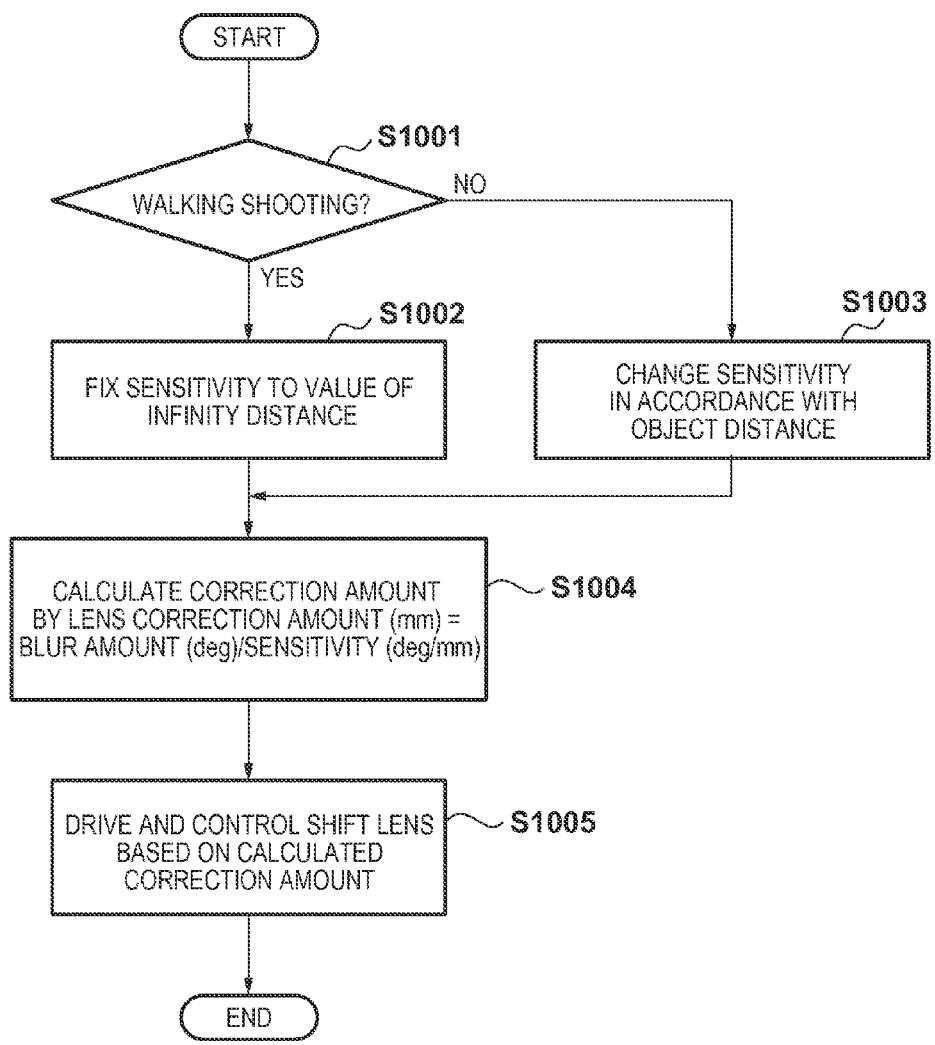
FIG. 2 is a flowchart illustrating from sensitivity generation to control of shift lens drive according to the first embodiment.

Operations of the sensitivity generation circuit 22 and the correction amount calculation circuit 23 will now be described in detail. FIG. 2 is a flowchart showing an operation from sensitivity generation to calculation of the moving amount (correction amount) of the shift lens 3. Note that the process shown in FIG. 2 is executed repetitively at an arbitrary predetermined period of, for example, 60 Hz at which one frame image of the image capturing apparatus is received.

In step S1001, the result of walking shooting determination obtained from the walking shooting determination circuit 21 is determined first. The determination method of "walking shooting" (whether or not the user is walking) will be described in detail later with reference to FIG. 3. As a result of the walking shooting determination, when it is determined that the photographer is walking, the process proceeds to step S1002; otherwise, the process proceeds to step S1003. In step S1002, the object distance is fixed to an infinity distance (a fixed value) without taking the object distance information from the object distance detection circuit 13 into account. The sensitivity generation circuit 22 defines sensitivity based on the value of the object distance, which is fixed to the infinity distance (fixed value), and the focal length information, which is obtained from the focal length detection circuit 9. Upon determining the sensitivity, the process proceeds to step S1004. In step S1003, the sensitivity generation circuit 22 defines sensitivity based on the object distance information, which is obtained from the object distance detection circuit 13, and the focal length information, which is obtained from the focal length detection circuit 9. Upon determining the sensitivity, the process proceeds to step S1004. In step S1004, the correction amount calculation circuit 23 calculates the moving amount (correction amount) of the shift lens 3. More specifically, the correction amount calculation circuit 23 calculates the moving amount (correction amount) of the shift lens 3 by the operation of equation (2) below, by using the sensitivity, which is set in step S1002 or S1003, and the angular displacement amount, which is obtained from the integrator 20:

lens moving amount (mm)=angular displacement amount (deg)/sensitivity (deg/mm)    (2)

Next, in step S1005, the correction amount calculation circuit 23 outputs the calculated lens moving amount (correction amount) to the shift lens control circuit 24. Then, the shift lens control circuit 24 drives and controls the shift lens 3.

The processes in steps S1002 and S1003 above will be described. When walking shooting is determined in step S1001, it is predicted that a variation of the object distance detected will be large due to wobbling operations of the focus lens. Therefore, the sensitivity generation circuit 22 defines sensitivity not by using the detection result of the object distance but by fixing the object distance to the infinity distance. When walking shooting is not determined in step S1001, it is predicted that the wobbling operations of the focus lens will be few as well as the detected variation in the object distance will be small. Therefore, the sensitivity generation circuit 22 determines the sensitivity based on the detection result of the object distance. Sensitivity represented by the ratio of an image displacement on an image plane to a driving amount of the shift lens is determined uniquely based on the focal length and the object distance. Therefore, the sensitivity can be determined based on the detected focal length and the object distance above determined from the determination result.

Note that in the above description, when walking shooting is determined, the sensitivity generation circuit 22 is assumed to fix the object distance to the infinity distance. However, the sensitivity generation circuit 22 may generate sensitivity by fixing the object distance not to the infinity distance but to another arbitrary object distance (for example, 10 m or 100 m).

As described above, sensitivity is determined uniquely based on the focal length and the object distance. However, methods as follows can be employed as a sensitivity generation method. First of all, as the first method, sensitivity is calculated by an operation from the values of the focal length and the object distance. Note that this method is not realistic very much because of its complex arithmetic expression. As the second method, a plurality of discrete sensitivity data (sensitivity information) corresponding to the focal length and the object distance is stored. This method can be implemented easily because it is only necessary to prepare a reference table based on the focal length and the object distance to store in advance, and read out the sensitivity data from the reference table in accordance with the detected focal length and the object distance. Furthermore, in order to reduce the size of table data, a plurality of representative reference tables may be prepared, and data of the focal length and the object distance between stored reference table data may be calculated by an interpolation operation based on the reference table.

Figure 3:
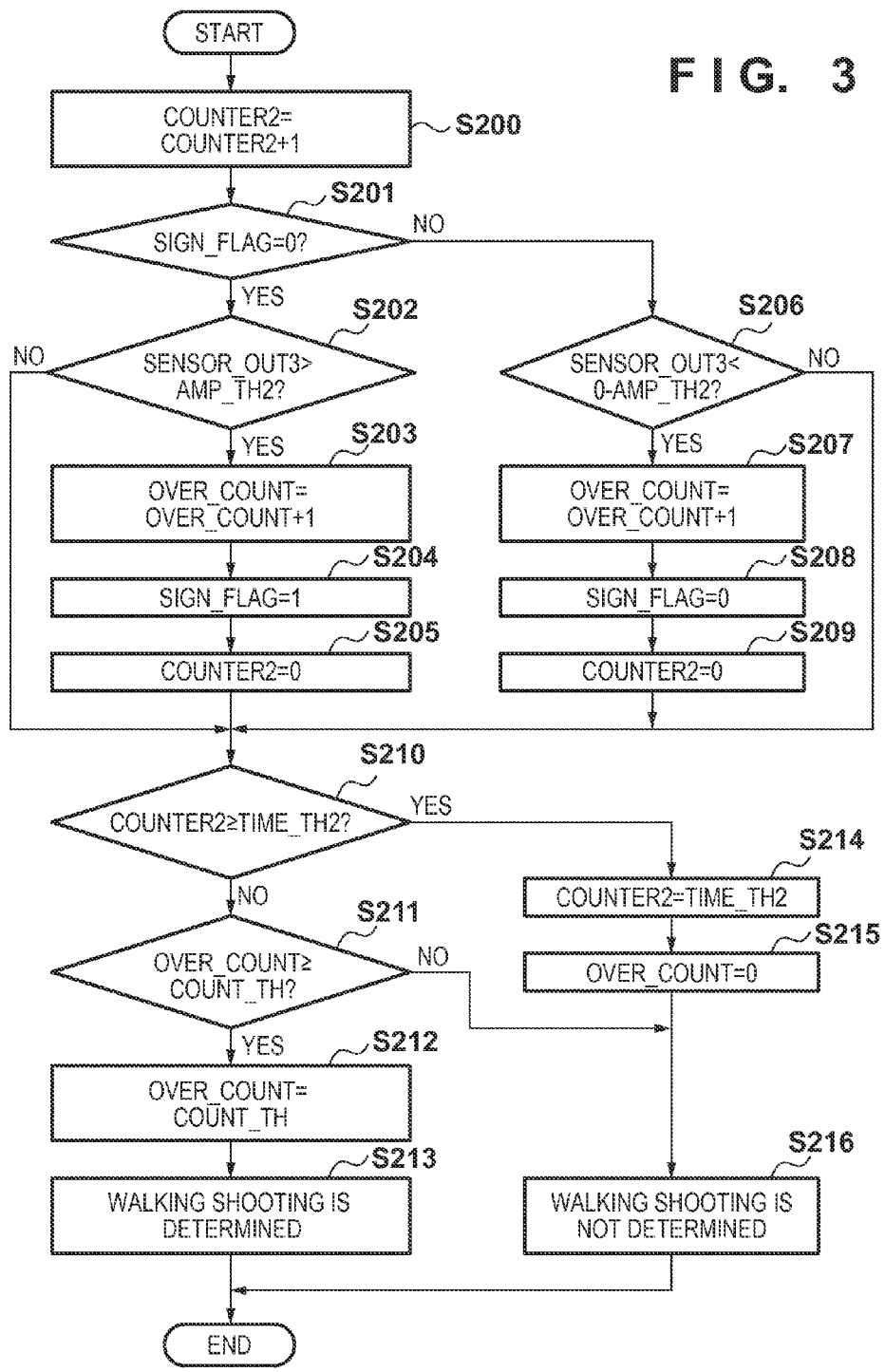
FIG. 3 is a flowchart showing the process of a walking shooting determination circuit according to the embodiment of the present invention.

An operation of the walking shooting determination will now be described in detail. FIG. 3 is a flowchart showing an operation of the walking shooting determination circuit 21. The process shown in the flowchart of FIG. 3 is executed repetitively at a predetermined period of, for example, 60 Hz. As an outline of the process in FIG. 3, it is determined that the photographer is shooting while walking when an output signal of the angular velocity sensor 17 is amplified, and the digital signal obtained via the A/D converter (not shown) turns positive and negative a predetermined number of times exceeding a predetermined amplitude in a predetermined period. In other words, the walking shooting determination circuit 21 determines that the photographer is shooting while walking when a change in a signal based on the output of the angular velocity sensor 17 is determined to be larger than a frequency and an amplitude set in advance, and outputs a determination result. The process in FIG. 3 will be described below.

In step S200, the walking shooting determination circuit 21 increments the value of counter COUNTER 2 and proceeds to step S201. In step S201, the walking shooting determination circuit 21 determines whether flag SIGN_FLAG is 0. When SIGN_FLAG is 0 in step S201, the process proceeds to step S202. When SIGN_FLAG is 1 in step S201, the process proceeds to step S206.

In step S202, variable SENSOR_OUT 3 is assumed to be a signal generated by the output signal of the angular velocity sensor 17 and received via the amplifier 18. A signal generated by the output signal of the angular velocity sensor 17 and received via the amplifier 18 may be a signal itself input to the microcomputer via A/D conversion, or a signal which has undergone arbitrary filtering processing is multiplied by a gain or the like after A/D conversion. That is, any signal may be used as long as it is generated by the output signal of the angular velocity sensor 17 and received via the amplifier 18. Moreover, in step S202, the walking shooting determination circuit 21 determines whether SENSOR_OUT 3 is larger than threshold AMP_TH 2. If Yes in step S202, the process proceeds to step S203. If No in step S202, the process proceeds to step S210.

In step S203, the walking shooting determination circuit 21 increments variable OVER_COUNT that represents the number of times the an amplitude of SENSOR_OUT 3 described above exceeds threshold AMP_TH 2. After incrementing variable OVER_COUNT, the process proceeds to step S204. In step S204, the walking shooting determination circuit 21 changes the value of flag SIGN_FLAG to 1, and determines No in step S201 when the process in FIG. 3 is executed the next time. In step S205, the walking shooting determination circuit 21 clears the value of counter COUNTER 2 incremented in step S200. Then, the process proceeds to step S210.

In step S206, the walking shooting determination circuit 21 determines whether SENSOR_OUT 3 described above is smaller than threshold (0-AMP_TH2). If Yes in step S206, the process proceeds to step S207. If No in step S206, the process proceeds to step S210.

In step S207, the walking shooting determination circuit 21 increments variable OVER_COUNT described above in the same manner as in step S203. Then, the process proceeds to step S208. In step S208, the walking shooting determination circuit 21 changes the value of flag SIGN_FLAG to 0, and determines Yes again in step S201 when the process in FIG. 3 is executed the next time. In step S209, the walking shooting determination circuit 21 clears the value of counter COUNTER 2 incremented in step S200, in the same manner as in step S205. Then, the process proceeds to step S210.

In step S210, the walking shooting determination circuit 21 determines whether counter COUNTER 2 incremented in step S200 is equal to or larger than threshold TIME_TH2. If Yes in step S210, the process proceeds to step S214. If No in step S210, the process proceeds to step S211. In step S211, the walking shooting determination circuit 21 determines whether the value of OVER_COUNT described above is equal to or larger than threshold COUNT_TH. If Yes in step S211, the process proceeds to step S212. If No in step S211, the process proceeds to step S216. In step S212, the walking shooting determination circuit 21 limits the value of OVER_COUNT to COUNT_TH so that OVER_COUNT does not overflow. Then, the process proceeds to step S213.

Step S213 is executed when the value of OVER_COUNT is incremented in the processes of steps S203 and S207 and COUNT_TH is reached before COUNTER 2 reaches TIME_TH 2. That is, step S213 is executed when an output of SENSOR_OUT 3 turns positive/negative a number of times exceeding OVER_COUNT with an amplitude larger than AMP_TH 2. At this time, it is determined that the photographer is in a state of walking shooting.

In step S213, the walking shooting determination circuit 21 outputs a determination result indicating walking shooting to the sensitivity generation circuit 22. After step S213, the process of FIG. 3 ends.

The process in step S214 is executed when TIME_TH 2 is reached without clearing COUNTER 2 in step S205 or S209. That is, the process in step S214 is executed when the output of SENSOR_OUT 3 continues to have an amplitude equal to or smaller than AMP_TH 2. At this time, it is determined that the photographer is not in a state of walking shooting. In step S214, the value of COUNTER 2 is limited to TIME_TH 2 so that COUNTER 2 does not overflow. Then, the process proceeds to step S215. In step S215, the value of OVER_COUNT is cleared. Then, the process proceeds to step S216.

Step S216 is executed when steps S214 and S215 are executed, and OVER_COUNT has not reached COUNT_TH, which is a threshold for determining whether the photographer is shooting while walking, yet. In step S216, it is determined that the photographer is not shooting while walking, and the determination result is output to the sensitivity generation circuit 22. After step S216, the process of FIG. 3 ends.

Figure 4:
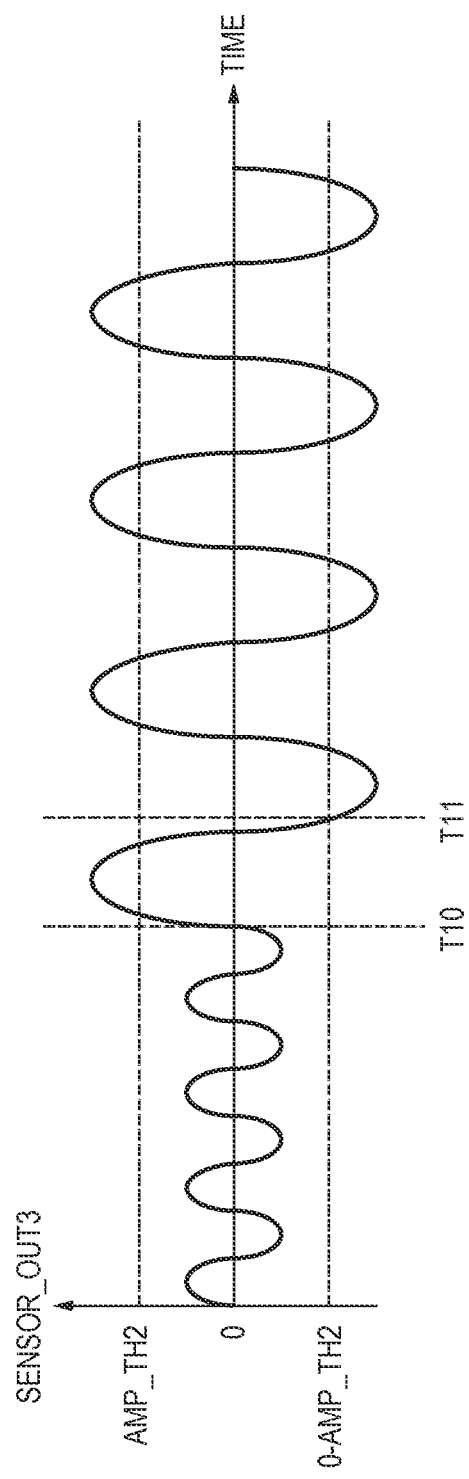
FIG. 4 is a graph explaining the process of the walking shooting determination circuit according to the embodiment of the present invention.

FIG. 4 is a graph for explaining the process of the walking shooting determination circuit 21. FIG. 4 is the graph showing a time-rate change in SENSOR_OUT 3, which is a signal generated by the output signal of the angular velocity sensor 17 and received via the amplifier 18. The period from time 0 to time T10 indicates that a fixed object is shot when the photographer is in a still state. After time T10, it indicates that the photographer shot while walking. SENSOR_OUT 3 indicates a state in which the output increases due to a vibration while walking after T10, but only relatively small camera shake is detected in the still state in a time before T10.

In the flowchart of FIG. 3, assuming COUNT_TH=2, walking shooting is determined after T11 at which the magnitude of the output of SENSOR_OUT 3 exceeds AMP_TH 2 in the positive and negative directions. By this determination, the walking shooting determination circuit 21 can determine, whether or not the photographer is in the state of walking shooting, using the output signal of the angular velocity sensor 17.

As described above, in the first embodiment of the present invention, an influence of a change in sensitivity along with a change in the object distance detected from the focus lens position is avoided during walking shooting. This enables stable blur correction without being affected by an unnecessary variation in the sensitivity even when a variation in the focus lens position occurs.

Second Embodiment

The second embodiment will now be described. In the first embodiment, the method of generating sensitivity by the sensitivity generation circuit 22 for a fixed object distance when walking shooting is determined is described.

In the second embodiment, the object distance is not only fixed to a single object distance but also limited to an object distance range with a small change in sensitivity (for example, a distance between 10 m and an infinity distance, in other words, near the infinity distance), and the sensitivity is generated in accordance with a detection result while the variation in the object distance falls within this range. The configuration of an image capturing apparatus according to the second embodiment is the same as in FIG. 1, and a description thereof will be omitted.

Operations of a sensitivity generation circuit 22 and a correction amount calculation circuit 23 in the second embodiment will now be described in detail.

Figure 5:
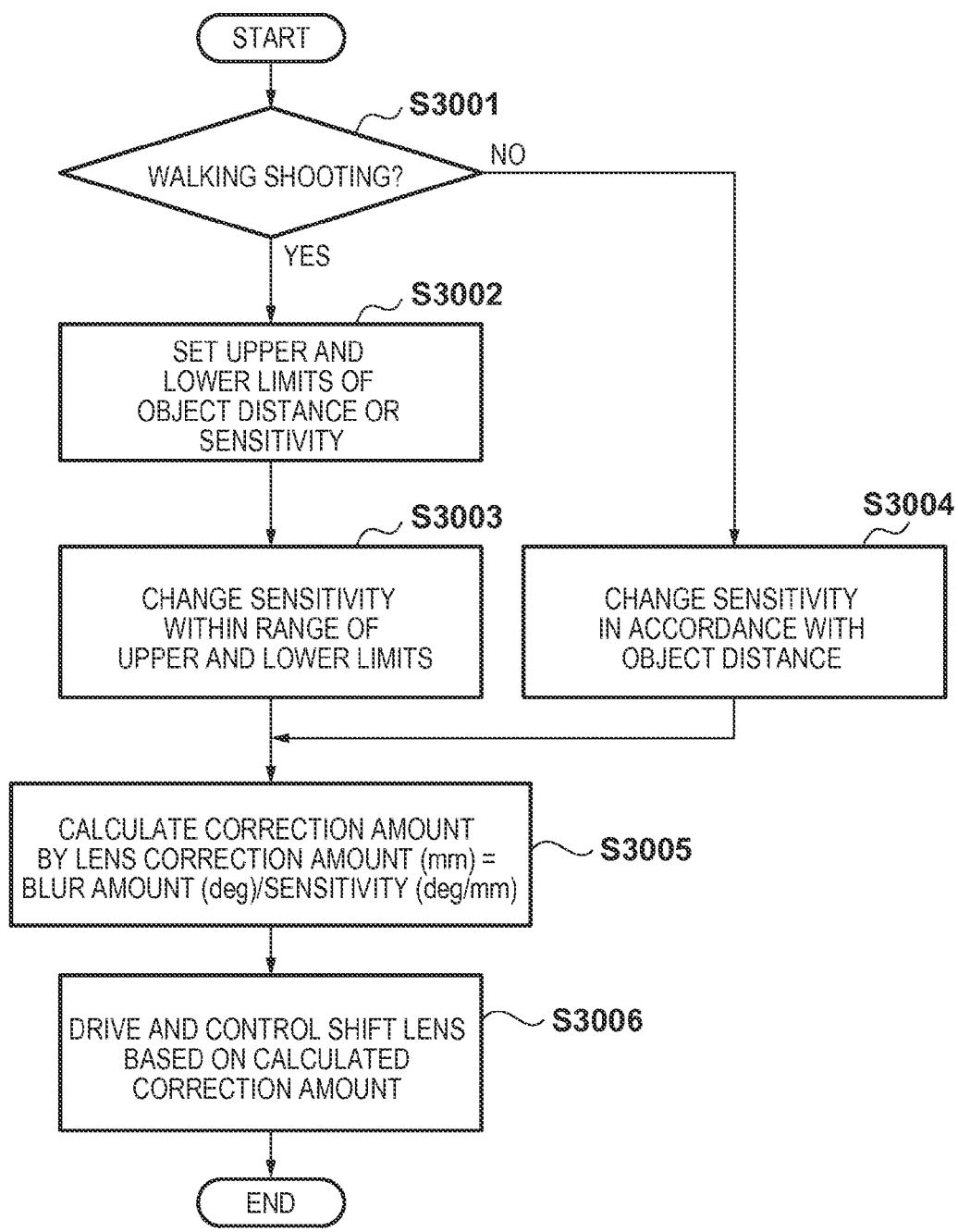
FIG. 5 is a flowchart illustrating from sensitivity generation to control of shift lens drive according to the second embodiment.

FIG. 5 is a flowchart showing an operation from sensitivity generation to calculation of a moving amount (a correction amount) of a shift lens 3. Note that process shown in FIG. 5 is executed repetitively at an arbitrary predetermined period of, for example, 60 Hz at which one frame image of the image capturing apparatus is received.

In step S3001, the result of walking shooting determination obtained from a walking shooting determination circuit 21 is determined first. As a result of the walking shooting determination, when it is determined that the photographer is walking, the process proceeds to step S3002; otherwise, the process proceeds to step S3004. In step S3002, the walking shooting determination circuit 21 sets upper and lower limits for object distance information from an object distance detection circuit 13, and sets an object distance so as not to exceed that range. Then, the process proceeds to step S3003. In the process in step S3003, the walking shooting determination circuit 21 defines sensitivity based on the object distance, which is set in step S3002, and a focal length, which is obtained from a focal length detection circuit 9. Then, the process proceeds to step S3005. In step S3004, the walking shooting determination circuit 21 defines the sensitivity based on an object distance, which is obtained from the object distance detection circuit 13 without setting the upper and lower limits, and the focal length, which is obtained from a focal length detection circuit 9. Then, the process proceeds to step S3005.

In step S3005, the walking shooting determination circuit 21 calculates a moving amount (a correction amount) of a correction lens. The moving amount (correction amount) of this correction lens is calculated by the same operation as equation (2) shown in the first embodiment using the sensitivity, which is set in step S3003 or S3004, and an angular displacement amount, which is obtained from an integrator 20. Next, in step S3006, the walking shooting determination circuit 21 outputs the calculated moving amount to a shift lens control circuit 24. Then, the shift lens control circuit 24 drives and controls the shift lens 3.

Aforementioned steps S3002 and S3003 will be described. In step S3002, the walking shooting determination circuit 21 sets upper and lower limits of the object distance by assuming that the variation width of the object distance falls in the range of, for example, 100 to 200 m when walking shooting is determined. Of course, the object distance set as the upper and lower limits may be in the range of an arbitrary predetermined value. For example, in the setting example described above, the object distance is set to 100 m when an object distance of 100 m or less is detected, and set to 200 m when an object distance of 200 m or more is detected. That is, in the case of an object distance exceeding the upper limit of the object distance, it is set to the upper limit of the object distance. On the other hand, in the case of an object distance exceeding the lower limit of the object distance, it is set to the lower limit of the object distance. By doing this, the variation in the object distance falls within the range of the set upper and lower limits. Then, in the step S3003, a sensitivity generation circuit 22 defines sensitivity based on the object distance which has been changed to fall within the range of the upper and lower limits.

In the example above, the object distance is set to 100 to 200 m. However, as with the focus lens position, a change in sensitivity to a change in the object distance is smaller as the object distance is nearer to infinity. Therefore, in order to make the variation in the sensitivity as small as possible, a fixed value of the object distance need only be set in an object distance range near the infinity distance.

Furthermore, as another method, the upper and lower limits may be set so that a change in the sensitivity at a focal length on the wide end or an arbitrary focal length on the wide side falls within a desired range. Moreover, the range of a change in the sensitivity may be defined so that a change in a lens correction amount in accordance with a change in the sensitivity falls within a desired range (which may be a standard performance value). Note that in step S3002, upper and lower limits are set for the object distance. However, as a process combining the processes in steps S3002 and S3003, sensitivity in accordance with the detected object distance may be calculated beforehand, and upper and lower limits may be set for that sensitivity so as to fall within a predetermined range. That is, upper and lower limits may be set for the detected object distance or the sensitivity determined based on the detected object distance.

As described above, in the second embodiment of the present invention, upper and lower limits are set for the change in the object distance detected from the focus lens position or the change in the sensitivity generated based on that information during walking shooting. Also, the sensitivity is prevented from changing more than necessary. This enables stable image stabilization without being affected by an unnecessary variation in the sensitivity even when a variation in the focus lens position occurs.

Third Embodiment

The third embodiment will now be described. In the first embodiment, the method of generating sensitivity by the sensitivity generation circuit 22 for a fixed object distance when walking shooting is determined is described. In addition, in the second embodiment, the method of setting upper and lower limits for the object distance or the sensitivity when walking shooting is determined is described.

In the third embodiment, a method of limiting sensitivity only in a predetermined focal length range on the wide side when walking shooting is determined will be described. The configuration of an image capturing apparatus according to the third embodiment is also the same as in FIG. 1, and a description thereof will be omitted.

Figure 6:
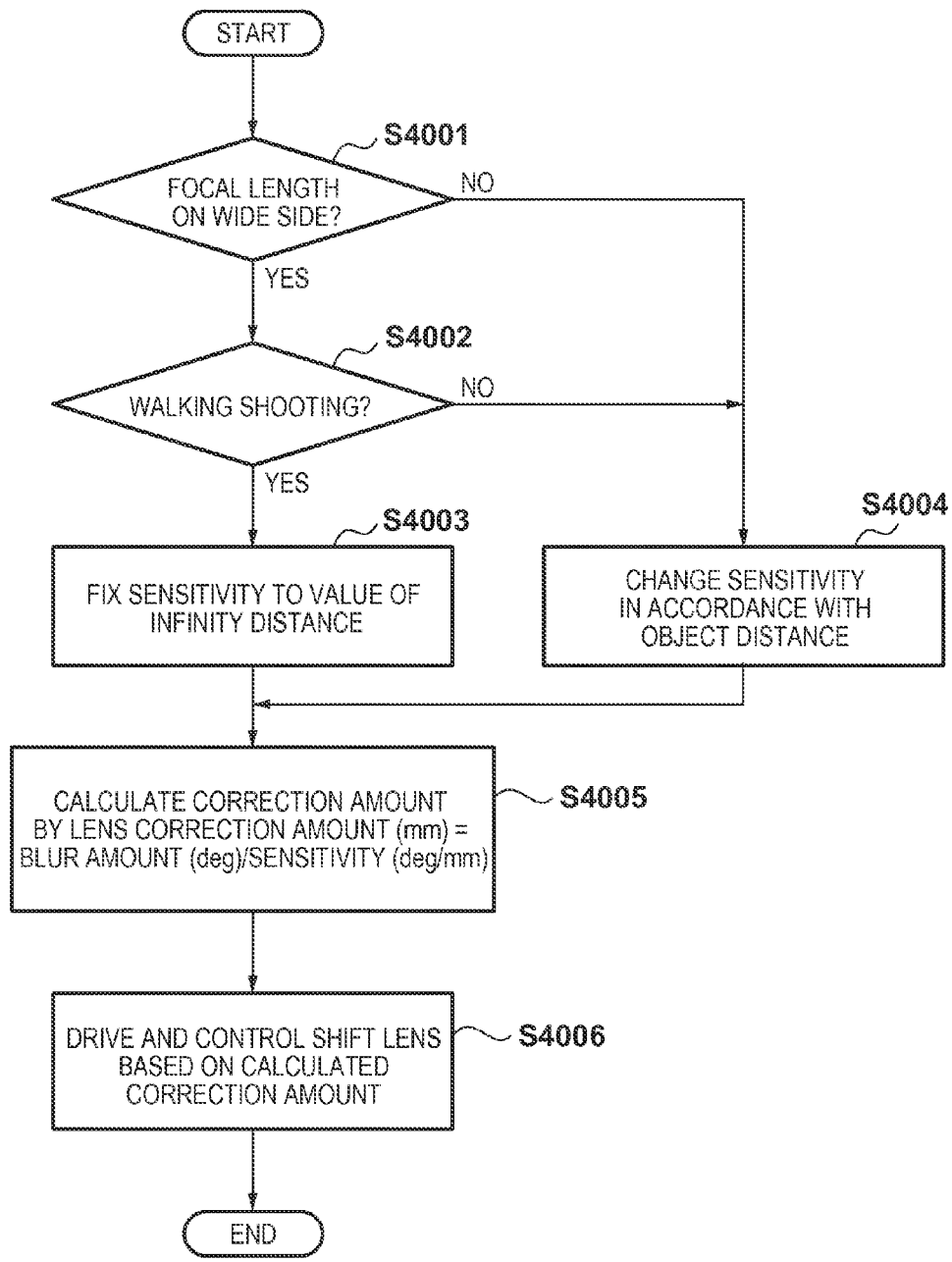
FIG. 6 is a flowchart illustrating from sensitivity generation to control of shift lens drive according to the third embodiment.
Figure 7:
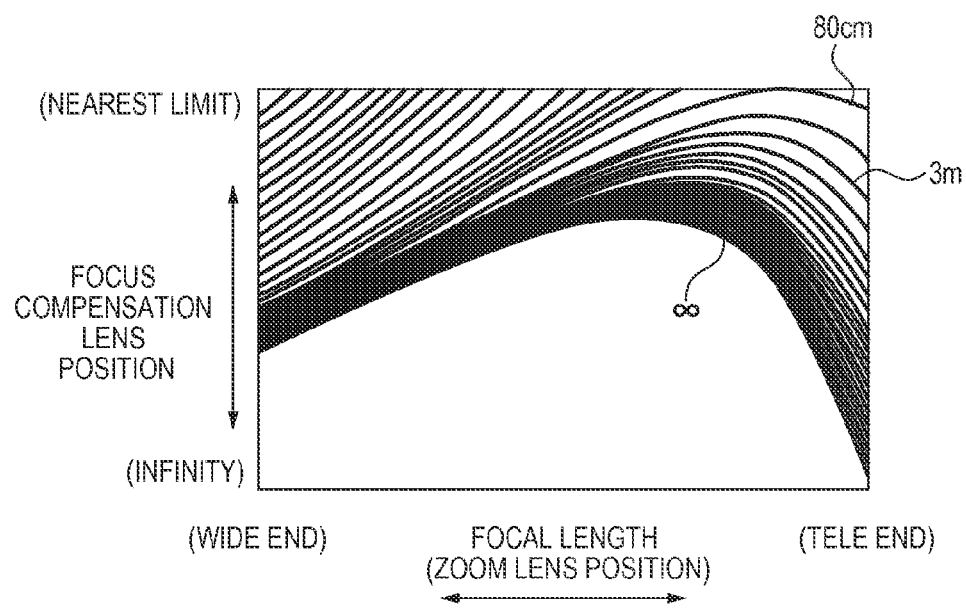
FIG. 7 is a graph showing an example of a cam locus representing a focus position for each object distance with respect to a zoom lens position in a lens system of the inner focus type.
Figure 8:
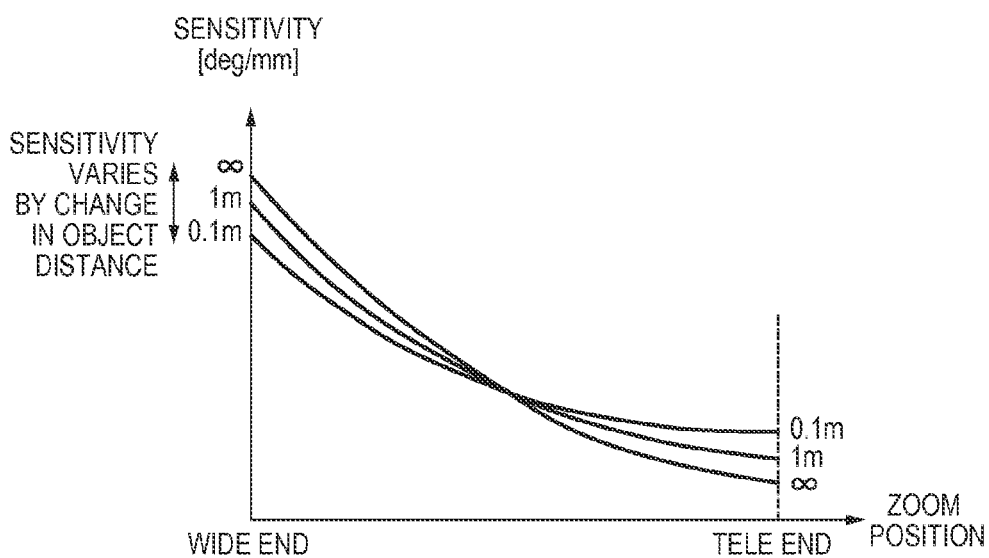
FIG. 8 is a graph showing an example of sensitivity of a shift lens for each object distance with respect to a zoom lens position in a lens system of the inner focus type.

Operations of a sensitivity generation circuit 22 and a correction amount calculation circuit 23 in the third embodiment will now be described in detail. FIG. 6 is a flowchart showing an operation from sensitivity generation to calculation of a moving amount (a correction amount) of a shift lens 3. Note that as in the first and second embodiments, the process shown in FIG. 6 is executed repetitively at an arbitrary predetermined period of, for example, 60 Hz at which one frame image of the image capturing apparatus is received.

In step S4001, it is determined whether a focal length obtained from a focal length detection circuit 9 is further on the wide side than a predetermined value. If Yes in step S4001, the process proceeds to step S4002. If No in step S4001, the process proceeds to step S4004. Next, in step S4002, the result of walking shooting determination obtained from a walking shooting determination circuit 21 is determined. As a result of the walking shooting determination, when it is determined that the photographer is walking, the process proceeds to step S4003; otherwise, the process proceeds to step S4004. In step S4003, the walking shooting determination circuit 21 fixes an object distance to an infinity distance without taking object distance information from an object distance detection circuit 13 into account. Then, the walking shooting determination circuit 21 defines sensitivity based on the object distance, which is fixed to the infinity distance, and the focal length, which is obtained from the focal length detection circuit 9. Then, the process proceeds to step S4005.

In step S4004, the walking shooting determination circuit 21 defines sensitivity based on an object distance, which is obtained from the object distance detection circuit 13, and the focal length, which is obtained from the focal length detection circuit 9. Then, the process proceeds to step S4005. In step S4005, the correction amount calculation circuit 23 calculates a moving amount of a correction lens. The correction amount calculation circuit 23 calculates the moving amount of the correction lens by the same operation as equation (2) shown in the first embodiment, using the sensitivity, which is set in step S4003 or S4004, and an angular displacement amount, which is obtained from an integrator 20.

Next, in step S4006, the calculated moving amount (correction amount) of the shift lens 3 is output to a shift lens control circuit 24. Then, the shift lens control circuit 24 drives and controls the shift lens 3.

As described above, in the third embodiment of the present invention, only on the wide side of a focal length where a variation in the object distance relative to a variation in the focus lens position is large, an influence of a change in sensitivity along with a change in the object distance detected from the focus lens position is avoided during walking shooting. This enables stable image stabilization without being affected by an unnecessary variation in the sensitivity even when the variation in the focus lens position occurs.

The present invention has been described above in detail based on preferred embodiments. However, the present invention is not limited to these specific embodiments and also incorporates various forms without departing from the spirit and scope thereof. Some of the above-described embodiments may appropriately be combined.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-286170, filed Dec. 27, 2012, which is hereby incorporated by reference herein in its entirety.

What is claimed is:
1. An optical apparatus comprising:
an imaging optical system including a correction lens, which corrects an image blur, a zoom lens for changing a focal length, and a focus lens, which performs focus adjustment;

a focal length detection unit configured to detect the focal length of an imaging optical system;

an object distance detection unit configured to detect an object distance;

a shake detection unit configured to detect a shake amount;

a walking shooting determination unit configured to determine whether or not a user of the optical apparatus is walking based on the shake amount detected by the shake detection unit;

a sensitivity generation unit configured to generate sensitivity, which is a ratio of a moving amount of an object image on an image sensing plane to a moving amount of the correction lens, based on a determination result by the walking shooting determination unit, the focal length, and the object distance;

a correction amount calculation unit configured to calculate a correction amount based on the shake amount and the sensitivity; and a control unit configured to drive the imaging optical system to correct the image blur based on the correction amount, wherein the sensitivity generation unit generates the sensitivity by limiting at least one of the object distance or the focal length, or a range of the sensitivity when the walking shooting determination unit determines that the user of the optical apparatus is walking.

2. The apparatus according to claim 1, wherein the sensitivity generation unit generates the sensitivity in a case in which the object distance is set to a fixed value when the walking shooting determination unit determines that the user of the apparatus is walking.

3. The apparatus according to claim 2, wherein the sensitivity generation unit generates the sensitivity in a case in which the object distance is set to an infinity distance when the walking shooting determination unit determines that the user of the apparatus is walking.

4. The apparatus according to claim 1, wherein the sensitivity generation unit generates the sensitivity by limiting the object distance to near an infinity distance when the walking shooting determination unit determines that the user of the apparatus is walking.

5. The apparatus according to claim 1, wherein the sensitivity generation unit generates the sensitivity by limiting the object distance or a range of the sensitivity only in a focal length range further on a wide side than a predetermined focal length when the walking shooting determination unit determines that the user of the apparatus is walking.

6. The apparatus according to claim 1, further comprising a storage unit configured to store a plurality of pieces of discrete sensitivity information for the focal length and the object distance, wherein the sensitivity generation unit generates the sensitivity by an interpolation operation from the sensitivity information stored in the storage unit based on the focal length and the object distance detected by the focal length detection unit and the object distance detection unit.

7. An image capturing apparatus comprising an optical apparatus of claim 1.

8. A method of controlling an optical apparatus, the method comprising:

detecting a focal length of an imaging optical system;

detecting an object distance;

detecting a shake amount;

determining whether or not a user of the optical apparatus is walking based on the detected shake amount;

generating sensitivity, which is a ratio of a moving amount of an object image on an image sensing plane to a moving amount of a correction lens which corrects an image blur, based on a determination result by the determining step, the focal length, and the object distance;

calculating a correction amount based on the shake amount and the sensitivity; and driving the correction lens to correct the image blur based on the correction amount, wherein the sensitivity is generated by limiting at least one of the object distance or the focal length, or a range of the sensitivity when it is determined that the user of the optical apparatus is walking.

9. A non-transitory computer-readable storage medium storing a program for causing a computer to execute each step of the method of claim 8.

10. An image blur correction apparatus comprising:

a processing circuit; and a memory in communication with the processing circuit, the memory including instructions that, when executed by the processing circuit, cause the image blur correction apparatus to:

detect a focal length of an imaging optical system;

detect an object distance;

detect a shake amount;

determine whether or not a user of the image blur correction apparatus is walking based on the detected shake amount;

generate sensitivity, which is a ratio of a moving amount of an object image on an image sensing plane to a moving amount of a correction lens which corrects an image blur and is included in the imaging optical system forming the object image, based on a determination of whether or not the user is walking, the focal length changed by a zoom lens included in the imaging optical system, and the object distance;

calculate a correction amount based on the shake amount and the sensitivity; and drive the correction lens to correct the image blur based on the correction amount, wherein the sensitivity is generated by limiting at least one of the object distance or the focal length, or a range of the sensitivity when it is determined that the user of the image apparatus is walking.

11. The apparatus according to claim 10, wherein the sensitivity is generated in a case in which the object distance is set to a fixed value when it is determined that the user of the apparatus is walking.

12. The apparatus according to claim 11, wherein the sensitivity is generated in a case in which the object distance is set to an infinity distance when it is determined that the user of the apparatus is walking.

13. An image blur correction apparatus comprising:

a processing circuit; and a memory in communication with the processing circuit, the memory including instructions that, when executed by the processing circuit, cause the apparatus to:

detect a focal length of an imaging optical system;

detect an object distance;

detect a shake amount;

determine whether or not a change in an output signal corresponding to a detected shake amount is larger than a predetermined amplitude;

generate sensitivity, which is a ratio of a moving amount of an object image on an image sensing plane to a moving amount of a correction lens, based on the detected shake amount, the focal length changed by a zoom lens included in the imaging optical system, and the object distance;

calculate a correction amount based on the detected shake amount and the sensitivity; and drive the correction lens to correct the image blur based on the correction amount, wherein the sensitivity is generated by limiting at least one of the object distance or the focal length, or a range of the sensitivity when the output signal corresponding to the detected shake amount is determined to be larger than the predetermined amplitude.

14. The apparatus according to claim 13, wherein the sensitivity is generated in a case in which the object distance is set to a fixed value when the output signal corresponding to the detected shake amount is determined to be larger than the predetermined amplitude.

15. The apparatus according to claim 14, wherein the sensitivity is generated in a case in which the object distance is set to an infinity distance when the output signal corresponding to the detected shake amount is determined to be larger than the predetermined amplitude.

16. A method of controlling an optical apparatus, the method comprising:

detecting a focal length of an imaging optical system;
detecting an object distance;
detecting a shake amount;
determining whether or not a change in an output signal of the shake amount detection step is larger than a predetermined amplitude;
generating sensitivity, which is a ratio of a moving amount of an object image on an image sensing plane to a moving amount of a correction lens, based on the shake amount detected by the shake amount detection step, the focal length, and the object distance;
calculating a correction amount based on the shake amount and the sensitivity; and
driving the correction lens to correct an image blur based on the correction amount,
wherein the sensitivity is generated by limiting at least one of the object distance or the focal length, or a range of the sensitivity when it is determined that the output signal of the shake amount detection step is larger than the predetermined amplitude.

17. An optical apparatus comprising:

an imaging optical system including a correction lens, which corrects an image blur, a zoom lens for changing a focal length, and a focus lens, which performs focus adjustment;
a focal length detection unit configured to detect the focal length of the imaging optical system;
an object distance detection unit configured to detect an object distance;
a shake detection unit configured to detect a shake amount;
a determination unit configured to determine whether or not a change in an output signal corresponding to a detected shake amount is larger than a predetermined amplitude;
a sensitivity generation unit configured to generate sensitivity, which is a ratio of a moving amount of an object image on an image sensing plane to a moving amount of a correction lens, based on the detected shake amount, the focal length, and the object distance;
a correction amount calculation unit configured to calculate a correction amount based on the detected shake amount and the sensitivity; and
a control unit configured to drive the correction lens to correct the image blur based on the correction amount,
wherein the sensitivity generation unit generates the sensitivity by limiting at least one of the object distance or the focal length, or a range of the sensitivity when the output signal corresponding to the detected shake amount is determined to be larger than the predetermined amplitude.

18. The apparatus according to claim 17, wherein the sensitivity generation unit generates the sensitivity in a case in which the object distance is set to a fixed value when the output signal corresponding to the detected shake amount is determined to be larger than the predetermined amplitude.

19. The apparatus according to claim 18, wherein the sensitivity generation unit generates the sensitivity in a case in which the object distance is set to an infinity distance when the output signal corresponding to the detected shake amount is determined to be larger than the predetermined amplitude.

20. The apparatus according to claim 17, wherein the sensitivity generation unit generates the sensitivity by limiting the object distance to near an infinity distance when the output signal corresponding to the detected shake amount is determined to be larger than the predetermined amplitude.

21. The apparatus according to claim 17, wherein the sensitivity generation unit generates the sensitivity by limiting the object distance or a range of the sensitivity only in a focal length range further on a wide side than a predetermined focal length when the output signal corresponding to the detected shake amount is determined to be larger than the predetermined amplitude.

22. The apparatus according to claim 17, further comprising a storage unit configured to store a plurality of pieces of discrete sensitivity information for the focal length and the object distance, wherein the sensitivity generation unit generates the sensitivity by an interpolation operation from the sensitivity information stored in the storage unit based on the focal length and the object distance detected by the focal length detection unit and the object distance detection unit.

* * * * *